United States Patent [19]

Jolly et al.

[11] Patent Number: 4,995,444

[45] Date of Patent: Feb. 26, 1991

[54] METHOD FOR PRODUCING METAL OR ALLOY CASTING COMPOSITES REINFORCED WITH FIBROUS OR PARTICULATE MATERIALS

[75] Inventors: Mark Jolly, Vessy; Guy Negaty-Hindi, Onex; Georges Haour, Geneva, all of Switzerland

[73] Assignee: Battelle Memorial Institute, Geneva, Switzerland

[21] Appl. No.: 535,986

[22] Filed: Jun. 8, 1990

Related U.S. Application Data

[63] Continuation of Ser. No. 162,257, Feb. 29, 1988, abandoned.

[30] Foreign Application Priority Data

Mar. 2, 1987 [EP] European Pat. Off. ........ 87810114.6

[51] Int. Cl.$^5$ ............................................. B22D 19/14
[52] U.S. Cl. ..................................... 164/97; 164/100; 164/120
[58] Field of Search ...................... 164/98, 97, 34, 35, 164/36, 120, 100

[56] References Cited

U.S. PATENT DOCUMENTS

| 4,033,400 | 7/1977 | Gurnwell et al. | 164/98 |
| 4,538,253 | 10/1985 | Funatani et al. | 164/97 X |
| 4,586,554 | 5/1986 | Tank et al. | 164/97 |
| 4,667,727 | 5/1987 | Barlow et al. | 164/97 |
| 4,669,523 | 6/1987 | Sabatie et al. | 164/98 X |
| 4,696,866 | 9/1987 | Tanaka et al. | 164/97 X |
| 4,712,600 | 12/1987 | Hamajima et al. | 164/98 X |
| 4,715,422 | 12/1987 | Tommis et al. | 164/97 |

FOREIGN PATENT DOCUMENTS

| 627229 | 7/1963 | Belgium | 164/34 |
| 0143330 | 6/1985 | European Pat. Off. | |
| 59-111970 | 6/1984 | Japan | 164/97 |
| WO84/02927 | 8/1984 | PCT Int'l Appl. | |
| WO86/03997 | 7/1986 | PCT Int'l Appl. | 164/97 |
| 1489346 | 10/1977 | United Kingdom | |
| 1595280 | 8/1981 | United Kingdom | |
| 2106433A | 4/1983 | United Kingdom | |

Primary Examiner—Kurt Rowan
Assistant Examiner—J. Reed Batten, Jr.
Attorney, Agent, or Firm—Cushman, Darby & Cushman

[57] ABSTRACT

A framework template of non-reinforcing material is provided containing, distributed therein and bonded to the building constituents thereof, a reinforcing material such as particles, fibers or whiskers of high tenacity nitrides, carbides, borides, oxides and the like, this distribution being arranged according to some given pattern of orientation and packing density. The template is placed in a mould which is then filled with molten metal which solidifies by cooling. During casting, the constituents of the template may be destroyed by the heat, or they may dissolve in the metal, or they can remain embedded therein.

19 Claims, No Drawings

METHOD FOR PRODUCING METAL OR ALLOY CASTING COMPOSITES REINFORCED WITH FIBROUS OR PARTICULATE MATERIALS

This is a continuation of application No. 07/162,257, filed on Feb. 29, 1988, which was abandoned upon the filing hereof.

BACKGROUND OF THE INVENTION

The present invention relates to reinforced cast metals and more particularly to a method for casting metals reinforced with particles or fibers or whiskers of reinforcing materials distributed throughout a metal or alloy matrix according to a desired pattern of packing density. In the castings of the present invention, the packing density distribution of the reinforcing material particles can be homogeneous throughout the metallic matrix or it can vary continuously or stepwise according to some predetermined pattern.

In the present description, reference will be made to the technique of squeeze casting which involves applying pressure over the metal in the mould before and during its solidification; it is however understood that the invention is not limited thereto and is also applicable to other casting methods in which means for causing the liquid metal introduced in the mould to fill the spaces between the reinforcing particles and embed these particles within the metal matrix is provided.

Using cast-in reinforcement materials in the casting of metals such as aluminum, magnesium, copper, zinc, lead, tin and other metals and alloys thereof is well known. For instance, documents US-A-4,576,863 and 4,590,132 disclose a light metal composite material reinforced by alumina-silica fibers.

Document GB-A-1.595.280 discloses a composite material comprising aluminum or an aluminum alloy reinforced with a felt or mat of alumina whiskers or fibers. A process for manufacturing such composite material is exemplified by the steps of:

(a) preheating a mat of whiskers or fibers of unmodified alumina in the cavity of a mould or die to a temperature in the range 250–850° C., introducing into the mould or die a molten mass of aluminum or of an alloy of aluminum free from any element which reacts with alumina in the temperature range, in an amount sufficient to cover said mat with the molten mass after application of pressure thereto, the aluminum or aluminum alloy being introduced at a temperature of 650–950° C., (b) directly applying to the molten mass in the mould or die sufficient mechanically-applied pressure to overcome the surface tension between said mat of whiskers or fibers and the molten mass, and thereby ensuring that the molten mass penetrates and fills the interstices of the mat, and (c) allowing the molten aluminum or alloy thereof to solidify in contact with the mat of whiskers or fibers to form a composite casting having alumina whiskers or fibers embedded in aluminum or aluminum alloy.

Document GB-A-2.106.433 also discloses reinforcing cast alloys used for pistons with a mat of whiskers or fibers of reinforcing materials such as $Al_2O_3$ or silicon carbide. A mat of this kind composed of fibers of about 2–5 $\mu$m diameter can be made by a process disclosed in document GB-A-1.489.346. The volume of the mat relative to the volume of metal in the matrix is in the range of 5–40%, preferably about 20%.

Document US-A-4,587,177 discloses metal matrix composites reinforced by mineral fibers, namely ceramic fibers. The drawing and the specification in this document indicate that in some embodiments, the packing density of the fibers is not constant throughout the metal matrix but varies according to one direction of space. Unfortunately, this document does not indicate how such variable packing density of the fibers can be achieved.

EP-A-143.330 also discloses the reinforcing of piston castings with felts or mats of fibers held together by a binder. Depending on its location within the matrix, the packing density of the fibers may vary. Although the document does not teach in detail how such variation is achieved, it may be assumed that it arises from the piling or otherwise distribution within the mould of two or more mat portions, each portion having a different packing density of the reinforcing material. This document also discloses adding to the fibers, during the preparation of the mat, additional finely divided materials such as silicon, $Al_2O_3$, $SiO_2$, SiC, $ZrO_2$, $Si_3N_4$, WC, TiC, $B_4C$ which, in chemical combination with the piston alloy will improve the properties of the piston metal in selected areas. The size of the particulate material may be between 0.025 $\mu$m and 1.0 $\mu$m.

Document EP-A-131.610 discloses that in the manufacture of mats of fibers to be used as reinforcement materials in the casting of light alloy articles, the fibers are stirred into a wetting agent containing carbohydrate, for instance a chlorinated hydrocarbon mixed with a sugar such as starch, glucose, fructose, sucrose, lactose and the like; then the slurry is pressed, drained of the liquid and dried to provide a selfsupporting mat of interwoven fibers. In a variant, before drying, the fibers are oriented into an array, for instance by extrusion through a nozzle.

When this structure is used for reinforcement in the casting of alloys, the binder is dispersed by the molten metal or alloy.

Other documents disclosing alloy reinforcement with various types of fibers and particles including SiC, carbon, graphite, $Si_3N_4$, etc., are listed hereafter: JP-A-61 000 538 (TOKAI CARBON); JP-A-60 115 360 (TOYOTA); JP-A-60 103 149 (NIPPON DENSO); JP-A-60 100 643 (IZUMI ZIDOSHA); JP-A60 083 763 (NIPPON DENSO); US-A-4.508.158 (INT. HARVESTER); JP-A-59 157 236 (SHOWA ALUMINUM); JP-A-59 145 742 (AGENCY OF IND. SCI. TECH.); JP-A-58.215.263 (TOYOTA); EP-A-45 002 (TOYOTA).

The foregoing summary of the prior art indicates that the materials used as webs, arrays or mats of fibers for casting reinforcement purposes include a wide variety of constituents, e.g. rods, staple, tow, filaments, fibers or whiskers made of materials with widely varying properties. For instance, silica and alumina fibers have moderate to low reinforcing properties and amounts (in mat form) of about 15–30% by volume of such fibers (relative to the volume of the composite) are needed for enhancing the mechanical properties of the castings by only 10–50%. Quantities over about 30% are not readily possible because the metal will no longer easily penetrate the pores of the structure even under pressure. On the other hand, SiC or $Si_3N_4$ whiskers or fibers in comparable amounts can raise the properties by a much larger factor, e.g. 600 to 1000%. This is often useless and undesirably costly in many applications where only limited reinforcement is needed, and when it is desired to use a relatively small concentration of high strength whiskers or fibers (SiC, Si$_3$N$_4$, TiC, WC, etc.). Some of these materials are relatively dense and large quantities would unduly increase the weight of the casting. The problem in this case is how to uniformly distribute in the metal matrix relatively small amounts of high strength whiskers or fibers, especially when the amount is only a few percents or less.

Normally, when the fibers or particles are supplied in mat form, the structure is self-supporting and strong enough to only undergo a minimum of deformation and variation of fiber distribution during casting of the molten metal. However, to yield a mat of sufficient rigidity, the proportion of fibers relative to total bulk volume occupied by the mat should be at least about 5–10% and is generally much more. Below this limit, the proportion of components is insufficient to maintain a self-sustaining framework and, as a consequence, an assisting bracing structure or template for supporting the fibers in a desired conformation and distribution becomes necessary.

SUMMARY OF THE INVENTION

Thus, this problem of distributing a relatively small amount of reinforcing material within a metal matrix was solved by using the method of the present invention.

DETAILED DESCRIPTION

The needed scaffolding structure incorporating the reinforcing fibers or particles can consist of an array, network or web of destructible or non-destructible components. One can use, for instance, silica, alumina or silica-alumina fibers of the kind used in the past techniques for casting reinforcement purposes; however, in the present case, these fibers contribute little or nothing to reinforcement and mainly serve to ensure a proper spatial distribution to the chosen reinforcing material within the space available. A preform of this kind is generally obtained by making a slurry of fibers in a suitable liquid medium (for instance water) containing a binder, for instance, a water soluble silicate-like sodium or potassium silicate. Of course, other binders and other liquid phases can also be used, for instance those disclosed in EP-A-131 610. After properly shaping the slurry, (the fibers being oriented or set at random), the liquid phase is separated and the remaining solid mass is dried to bind the fibers into the desired mat configuration. In the case of the present invention, the correct amount of high tenacity fibers, for instance SiC or Si$_3$N$_4$ whiskers in a proportion of, say, 5 to 100% relative to the template fibers, i.e. 0.1 to 10% by volume relative to the bulk of the preform, is added to the slurry and uniformly distributed by mixing with the supporting fibers. Then, the cake is processed as usual and used for reinforcement. In this case the supporting framework is permanent and remains as such in the metal matrix although its contribution to total reinforcement is little or insignificant, especially at ambient temperatures.

In a modification, the supporting framework can be made of a material which melts away or decomposes at the temperature of the molten metal used for casting. For this, textile or plastic fibers including cellulose, polystyrene, polyethylene and polymethacrylates are suitable. The preformed structure is temporary, the constituents thereof being fused within the metal matrix wherein the preformed structure is introduced into a casting mould or die, filling the mould or die with molten metal or alloy and causing it to infiltrate the interstices in the preform and thus embed the particles or fibers within the metal to form the matrix of the casting composite. The constituents of the preformed structure are made of an alloy or metal which dissolves in the molten metal upon casting. The technique involved is very similar to the foregoing one, except that slurrying will preferably involve using an organic binder such as a glue, a starch, or an oligomer composition which can bind together in a random or predetermined fashion the organic framework components and the high-strength reinforcing fibers. When molten metal is poured over the resulting structure and forced into its interstices, the organic polymer chars, melts or decomposes either partially or totally, or it is eliminated by vaporization, or it is dispersed, leaving the reinforcing fibers practically undisturbed and distributed through the matrix in essentially the same position they previously were in the fiber network. Solidification of the cast metal is sufficiently rapid to prevent sedimentation of the reinforcing particles after decomposition of the supporting network.

In another modification, a template structure can be first made without the reinforcing material and the latter can be deposited on the surface of the framework constituents by conventional means. For instance, a template preform is made of refractory fibers (Al$_2$O$_3$-SiO$_2$) and Si$_3$N$_4$ is deposited at high temperature on the fibers by CVD, the reactants being for instance a silane or SiCl$_4$ and appropriate nitrogen compounds, for instance, ammonia. In this case, the reinforcing material is in the form of a coating or whiskers grown in situ on the preform members.

The use of partially compressible preforms is also contemplated in this invention. Deformable structures are useful for varying the distribution of the reinforcing material within a preform according to a desired pattern before infiltrating with molten metal during casting. For instance, crosslinked framework precursors are provided containing the reinforcing particulate material distributed uniformly throughout and then the precursors are subjected to deformation, either in a press or under a pressurized atmosphere, whereby the structure will collapse to some degree under compression, to provide a partially densified framework. Starting with the same packing density, the higher the amount of compression, the greater the concentration of the reinforcing filler in the reduced size template. Stacking several of such compressed structures with varying densities of reinforcing material upon each other provides a laminate with a reinforcement capacity that varies in the direction of stacking according to a certain pattern. Alternatively, several non-compressed structures, each containing a different proportion of reinforcing material, can be stacked together and provide the desired concentration variation pattern. Each of these layers is prepared by the felt-making technique described previously, the only difference being the proportion of the high-strength reinforcing material in the cake forming slurry.

Still alternately, a graded pattern can be produced by diffusely depositing a reinforcing material on the internal surface of a porous template preform. For instance, a framework of cross-linked refractory fibers is placed in an enclosure adapted for the deposition by vacuum evaporation or otherwise of a reinforcing material such as AlN, Si$_3$N$_4$, TiC, etc. and vapors of such reinforcing material are diffused through the structure from one side thereof to the opposite side, whereby a concentration gradient of reinforcing material will deposit in the inside of the structure with a corresponding gradient of reinforcing properties, the concentration being greater on the side facing the source of evaporation and lesser on the opposite side. Naturally, CVD (i.e., chemical vapor deposition) techniques can be substituted to evaporation.

When mineral fibers are used to constitute the supporting framework used in this invention, the preformed material is selected from deshotted fibers sold under the trade names of KAOWOOL, FIBERFRAX, SAFFIL, etc. These fibers, can be amorphous or crystalline and, are made of alumina, silica or alumina-silicate. For instance, KAOWOOL deshotted fibers contain 35–65% of $Al_2O_3$ by weight and 65–35% of $SiO_2$ by weight. SAFFIL deshotted fiber material is a crystalline material containing about 96–97% $Al_2O_3$ by weight. These fibers may, in some cases, contain less than about 10% of other metal oxides. Naturally, other fibers such as asbestos, Rockwool and the like are also usable. "Deshotted" means that the fibers contain no more than about 5% of non-fibrous components larger than about 150 μm. Preferably however, this amount should not exceed 1%. The volume proportion of such fibers in the resulting mat or felt to ensure sufficient rigidity is about 7 to 30%. However, these limits can be exceeded in special cases by varying the slurry making ingredients, i.e. for instance, increasing the amount of binder (which is normally 0.5 to 15%) or using a more viscous liquid phase.

The preferred amount of reinforcing materials to be incorporated and distributed within the template constituents is about 0.5 to 15% but these concentrations are not critical and these limits can be exceeded in special cases. The reinforcing materials preferably include TOKAMAX SiC whiskers, $Si_3N_4$ whiskers, $Al_2O_3$ whiskers, AlN, carbon (graphite), WC, $Si_3N_4$, boron nitride, boron carbide and the like. The fibers or whiskers have preferably a length of 20 μm to about 20 mm and a thickness of less than a micron to several tens of microns, say 0.1 μm to 200 μm.

The volume occupied by the total of the framework material plus the reinforcing material relative to the bulk volume of the preform (or, in other words, to the volume of the metal matrix embedding the preform) is preferably in the range of 7–35%. Although these limits can be somewhat exceeded in some cases, it should be remembered that, below 5% by volume, the structure becomes very weak and may collapse partially or totally during casting. Contrastingly, when the volume of the fibrous or particulate constituents exceeds about 40%, it becomes more and more difficult to build the preform; furthermore, the force required to infiltrate the molten metal into the interstices of the structure increases and the resulting stress may damage the fibers of the reinforcing material or the integrity of the preform itself.

It is possible, when making the supporting framework of this invention, to further add to the intermediate slurry other ingredients which may ultimately improve or otherwise modify the properties of the cast metal. For instance, ingredients for inducing nitridation, carbidation or cementation are possible. Also very finely divided minerals and metal compounds such as disclosed in EP-A-143 330 are possible.

The supporting framework preform used in this invention is generally made as follows, although any other method generally known in the art is also possible:

Selected amounts of supporting fibers and the reinforcing material are dispersed in a liquid phase ($H_2O$, alcohol or other organic liquids or water-organic mixtures). This liquid phase may, in some cases, contain deflocculating agents (e.g. a compound available under the trademark PERCOL,). Then the pH may be adapted to a determined value (usually near neutrality, but either on the acid or the basic side, depending on the properties of the solid) to ensure good slurry workability. Then, one or more binders are added. These can be selected from among organic binders (starch, latex, hydrophilic prepolymers like hydroxy acrylates, etc.) and mineral binders (alkali silicates, colloidal silica, organic silicates or aluminates which provide, by hydrolysis, metaloxane cross-linking oligomers and polymers). Then, the slurry is stirred and the fibrous material dispersed at random or in some oriented fashion (for instance by nozzle means or by centrifuging). When centrifuging is used for orienting the fibers, the direction of orientation may be, depending on the mould construction and its positioning on the centrifuge, parallel or perpendicular to the field direction. Thus, when using annular molds on the periphery of a rotating carrier disk, the fibers orient themselves tangentially, i.e. cross-wise to the field. When the moulds are radially positioned, elongation forms extending along a radius of a rotating disc carrier, the fibers orient themselves parallel to the field.

Thereafter the solid may be drained from the excess of liquid by filtration or decantation and dried. Drying can be effected by suction and/or by the application of heat (evaporation). Useful temperatures are in the range of 100–200° C.

At this stage, the mat can be fired at 600–1250° if full decompositions of the organics before casting is desired. Otherwise, it may be used as is and introduced directly into the casting mould. The casting itself is carried out by usual means and preferably pressure is applied over the molten metal in the mould according to the conditions prevailing in "squeeze-casting" to force the metal into the interstices of the preform structure. It should be noted that although the preform is not normally intended to provide reinforcement, its partial decomposition by heat may provide a material with reinforcement properties. This is illustrated by the case of $Si_3N_4$ reinforcing fibers dispersed in a mat of cellulose fibers which, in contact with the molten alloy at temperatures in the range of 500° C. or more will pyrolyze into carbon fibers.

The following examples illustrate the invention:

EXAMPLE 1

The following ingredients were stirred at room temperature in an excess of water (about 1 liter) to make a slurry; (the quantities are given in grams, parts per weight and parts per volume)

| | |
|---|---|
| $Al_2O_3.SiO_2$ (KAOWOOL) | 50 g (39.75 ppw = 15 ppv) |
| SiC whiskers (TOKAMAX) | 20 g (16.1 ppw = 5 ppv) |
| Sodium silicate | 3 g (2.4 ppw = 1 ppv) |

N HCl was added drop by drop until the pH was about 7.5–8 and stirring was continued until a homogeneous mixture was obtained. The SiC whiskers were uniformly dispersed within the KAOWOOL carrier fibers.

Then the slurry was poured over a Büchner filter and the liquid was drained by suction until about 600–700 ml were removed. During suction, the height of the cake decreased as compaction progressed, until a cake of 90 mm diameter by 15 mm in height was obtained. Compaction is assisted by the application of mechanical pressure (by means of a wooden piston and weights introduced on top of the cake) simultaneously with suction or in a subsequent step. The cake was then allowed to completely dry in a vacuum oven which was progressively heated to 200° C. At this stage, the preform had a volume of about 95 cubic centimeters and overall density of about 0.56/cm$^3$. Then it was fired for 20 minutes at 800–1000° C. to reinforce the structure and the binding of the SiC whiskers to the framework.

The preform was put into a casting mould which was filled with liquid aluminum alloy (A356) maintained at 780° C. A pressure of 500–2000 bar(50–200 MPa) was applied to the molten metal which was allowed to solidify by cooling.

A tensile strength reinforcement of 300% greater than the unreinforced matrix strength at 400° C. of the metal matrix was measured by usual techniques. Similar results were obtained when the alloy was Sr modified of contained a grain refiner.

EXAMPLES 2 TO 7

Using the technique disclosed in Example 1, several fiber preforms holding reinforcement materials were prepared and used as reinforcement in squeeze-casting trials. The following table provides data on the ingredients used and amounts expressed in volume % of the preform, the alloy used for casting and the results on reinforcement. In all cases the reinforcing materials were homogeneously distributed throughout the metal matrix. The results are expressed in percent increase of tensile strength at a given temperature, compared to the corresponding non-reinforced alloy.

| Ex. | Carrier material (volume %) | Reinforcing Material (volume %) | Binder (volume %) | Casting alloy | Results |
| --- | --- | --- | --- | --- | --- |
| 2 | Al$_2$O$_3$.SiO$_2$ (FIBREFAX) (15) | SiC (10) Whiskers | Na Silicate (5) | AA-2014 Al alloy | >500% 400° C. |
| 3 | Al$_2$O$_3$.SiO$_2$ (10) | Si$_3$N$_4$ Whiskers (2.5) | Na Silicate (10) | LM-13 Al—Si eutectic alloy | >80% 300° C. |
| 4 | Al$_2$O$_3$ (SAFFIL) (20) | Si$_3$N$_4$ Whiskers (10) | Na Silicate (3) | A-356 Al alloy | >1000% 400° C. |
| 5 | Al$_2$O$_3$—SiO$_2$ (10) | SiC Whiskers (5) | Na Silicate (7) | HK-3117 Mg Alloy | >150% 370° C. |
| 6 | Al$_2$O$_3$ (SAFFIL) (7) | SiC Whiskers (1) | Na Silicate (4) | AA-2014 Al alloy | >100% 370° C. |
| 7 | Al$_2$O$_3$—SiO$_2$ (KAOWOOL) (10) | SiC Whiskers (5) | Na Silicate (5) | 2014 | >250% 400° C. |

In all the above described Examples the reinforcing fibers were evenly distributed in the alloy matrix of the casting.

EXAMPLE 8

A slurry was made of carrier fibers and reinforcing material as described in Example 1, but with the ingredients and quantities of Example 2 (by volume 15% of FIBREFAX deshotted fibers, 10% of SiC whiskers and 5% of silicate binder). The slurry was divided into four portions of equal volume which were individually drained from the suspending liquid but each to a different extent, i.e. the amount of liquid withdrawn was, in percent, 60, 70, 80 and 90%, respectively. Then the cakes were made free of the residual liquid and fired as disclosed in Example 1. The four preforms obtained were unequal in height and volume and the packing density of the SiC fibers therein was correspondingly different. The preforms were stacked in a casting mould (the last one of higher density being inserted first and the other in order of progressively increasing bulk) and metal (AA-2014) was cast in the mould as previously disclosed under a pressure of 800 bar (80 MPa). The casting thus obtained had a variable reinforcing density pattern, its bottom having a higher density of SiC reinforcing fibers than the upper portions.

EXAMPLE 9

A mat preform was prepared as described in Example 1 but using 70 g of KAOWOOL deshotted fibers (weight ratio Al$_2$O$_3$/SiO$_2$ about 1:1), 8 g of liquid glass (sodium silicate) and no reinforcing material.

After drying as usual, the preform was fired for several hours at 1200–1250° C. under an inert low-pressure atmosphere (Ar) which effected crystallization of a portion of the amorphous material into mullite. Several other preforms were made similarly.

Then the preforms were subjected to chemical vapor deposition techniques (CVD) according to the method disclosed by A. KATO et al. in the Journal of Crystal Growth 41 (1980) 199–203 incorporated here by way of reference. The method consists in subjecting the substrate to the following reactions in the gas state:

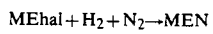

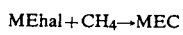

in which MEhal, MEN and MEC are arbitrary symbols to designate a metal halogenide, a metal nitride and a metal carbide, respectively. In this case MEhal included TiCl$_4$ and ZrCl$_4$ and the products were titanium and zirconium nitride and carbide respectively. These were obtained as reinforcing whiskers grown on the crystallized portions of the preform subjected to CVD.

The apparatus used was a conventional CVD apparatus such as disclosed in US-A-4,576,836 which comprises a heated infiltration enclosure in which the preform is maintained and a series of pipes to admit the gaseous reagents into the infiltration enclosure. The hydrogen, methane and nitrogen gases are drawn from pressure bottles via suitable valves and rotameters. The metal halides are either supplied from bubbling bottles (as disclosed in EP-A-23471) or made in-situ in a chloridizer from the corresponding metal and chlorine as disclosed in US-A-4,576,836 included by way of reference.

In the present experiments, the gases were brought together in correct ratios and driven into the interstices of the porous preform exactly as in the case of the preform (11) of US-A-4,576,836 whereby they reacted and deposited the desired reinforcing materials.

Thus, preforms with a deposit of reinforcing metal carbides or nitrides were obtained which were thereafter used to reinforce the matrix of metal casting as described in the previous Examples.

By varying the rate of admission of the reagents into the infiltration enclosure, uniform depositions or depositions with a gradient profile could be achieved. Preforms with a gradient profile of deposited reinforcing material were used to provide a variable reinforcement profile in the metal matrix of the castings.

In a variant of this Example, the mat was given an electroless Ni coating of a few nm by usual means before being subjected to the gas phase reactions. Improved deposition of carbides and nitrides resulted from this pretreatment.

EXAMPLE 10

A felt was provided by conventional felt making techniques containing (by volume) 20% of textile fibers (cotton) and 1% of $Si_3N_4$ whiskers distributed homogeneously therethrough. The felt was placed into a casting mould which was then filled under a pressure of 1500 bar (150MPa) with a copper-aluminum bronze alloy molten at a temperature of about 1200° C. The textile mat was pyrolyzed and decomposed but solidification of the alloy became effective and the $Si_3N_4$ remains evenly distributed therein as shown by mechanical testing effected on several portions of the alloy and which gave practically identical results.

We claim:

1. A method for producing metal or alloy casting composites, consisting essentially of a metal matrix reinforced with fibers or particles of reinforcing material distributed in this matrix according to a desired pattern, which comprises the steps of:
   (a) providing a self-supporting template preform structure having no to little reinforcing properties, made of a porous body or of a network of cross-linked building constituents containing particles or fibers of reinforcing material distributed in pores or in voids between said constituents of the structure and binding said particles or fibers of reinforcing material according to a desired pattern, to said constituents of said preform structure by adding a binder substance;
   (b) introducing said preform structure into a casting mould or die, filling said mould or die with a molten metal or alloy and causing said molten metal or alloy to infiltrate interstices in the preform structure and thus embed said particles or fibers within the metal to form a matrix of a casting composite; and
   (c) allowing the molten metal or alloy to solidify, and separating the resulting solidified casting composite from the mould.

2. The method of claim 1, in which the reinforcing material has a packing density pattern which is uniform.

3. The method of claim 1, in which the metal or alloy is selected from light alloys, aluminum, magnesium, copper, zinc, lead, tin and alloys thereof.

4. The method of claim 1, in which the reinforcing material is selected from metal oxides, carbides, nitrides and borides.

5. The method of claim 1, in which the reinforcing material is selected from SiC, graphitic carbon, $Si_3N_4$, WC, TiN, TiC, ZrN, ZrC, AlN and $B_4C$.

6. The method of claim 1, in which the reinforcing material has a packing density pattern which varies directionally.

7. The method of claim 6 in which said packing density pattern varies by steps.

8. The method of claim 6 in which said packing density pattern varies continuously.

9. The method of claim 1, in which the preform structure is temporary, the constituents therof being fused within the metal matrix during step (b).

10. The method of claim 9 in which said constituents are made of an alloy or metal which dissolves in the molten metal or alloy upon casting.

11. The method of claim 1, in which the preform structure is temporary, the constituents thereof being eliminated during step (b).

12. The method of claim 11 in which said constituents are made of an organic polymer which volatilizes at the temperature of the molten metal or alloy.

13. The method of claim 11 in which said constituents are made of an organic polymer which decomposes at the temperature of the molten metal or alloy.

14. The method of claim 1, in which the preform structure is permanent, the constituents thereof being made of a refractory mineral material.

15. The method of claim 1, in which said preform constituents are fibers selected from $Al_2O_3$, $SiO_2$, $Al_2O_3$-$SiO_2$, magnesium silicate, rock-wool and asbestos.

16. The method of claim 1, in which said binder is selected from alkali metal silicates, colloidal silica, alkyl silicates, starch, sugars, hydroxylic polymers, glues, and gums.

17. The method of claim 1, in which pressure is applied over the molten metal in the mould, thereby squeeze casting the casting.

18. A method for producing metal or alloy casting composites, consisting essentially of a metal matrix reinforced with fibers or particles of reinforcing material distributed in this matrix according to a desired pattern, which comprises the steps of:
   (a) providing a self-supporting template preform structure made of a porous body or of a network of cross-linked building constituents containing particles or fibers of reinforcing material distributed in pores or in voids between said constituents of the structure and binding said particles or fibers of reinforcing material according to a desired pattern, to said constituents of said preform structure by adding a binder substance, said step (a) being achieved by,
     (i) forming a homogeneous slurry of preform building constituents and said binder in a liquid medium, and
     (ii) forming this slurry into a cake in a desired preform shape and removing liquid from the cake to obtain a dry preform structure;
   (b) introducing said preform structure into a casting mould or die, filling said mould or die with a molten metal or alloy and causing said molten metal or alloy to infiltrate interstices in the preform structure and thus embed said particles or fibers within the metal to form a matrix of a casting composite; and (c) allowing the molten metal or alloy to solidify, and separating the resulting solidified casting composite from the mould.

19. A method for producing metal or alloy casting composites, consisting essentially of a metal matrix reinforced with fibers or particles of reinforcing material distributed in this matrix according to a desired pattern, which comprises the steps of:

(a) providing a self-supporting template preform structure having no to little reinforcing properties, made of a porous body or of a network of cross-linking building constituents containing, particles or fibers of reinforcing material distributed in pores or in voids between said constituents of the structure and binding said particles or fibers of reinforcing material according to a desired pattern, to said constituents of said preform structure by coating said constituents with said particles of reinforcing material;

(b) introducing said preform structure into a casting mould or die, filling said mould or die with a molten metal or alloy and causing said molten metal or alloy to infiltrate interstices in the preform structure and thus embed said particles or fibers within the metal to form a matrix of a casting composite; and (c) allowing the molten metal or alloy to solidify, and separating the resulting solidified casting composite from the mould.

* * * * *